United States Patent Office 2,832,363
Patented Apr. 29, 1958

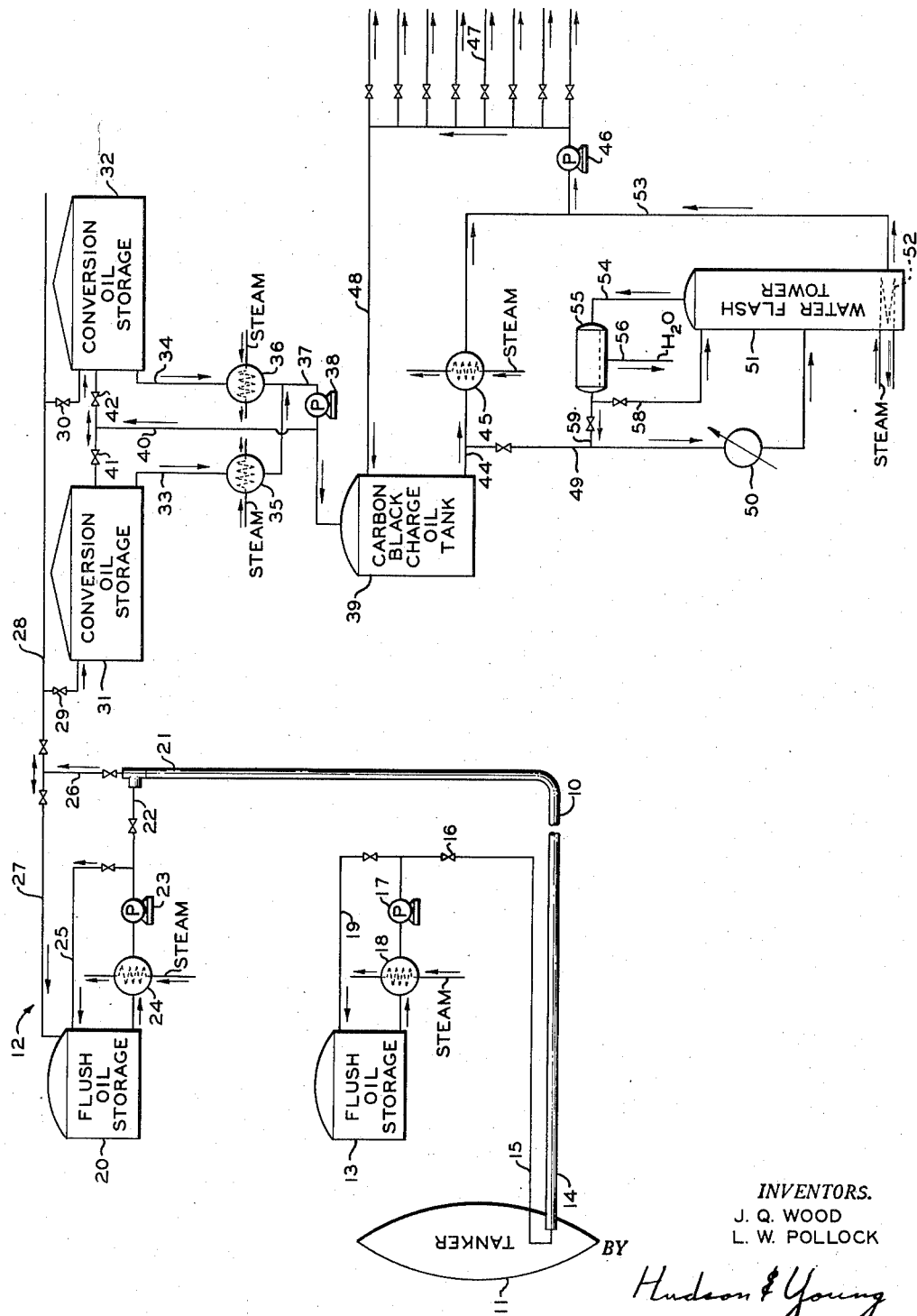

2,832,363

METHOD AND APPARATUS FOR TRANSPORTING HEAVY VISCOUS FLUIDS

James Q. Wood and Lyle W. Pollock, Bartlesville, Okla., assignors to Phillips Petroleum Company, a corporation of Delaware Application June 20, 1955, Serial No. 516,504

10 Claims. (Cl. 137—1)

This invention relates to a method and apparatus for transporting heavy viscous fluids.

In transporting heavy viscous materials through pipelines, particularly surface pipelines, the pumping rate is oftentimes very slow, and considerable difficulties are encountered during cold weather in transporting the oil through the pipeline at all. This is a particularly serious problem with certain types of highly aromatic petroleum residues which are used in the manufacture of carbon black. The oil normally arrives by tanker at one terminus of the pipeline and is discharged from the other end to furnaces where it is converted into carbon black by incomplete combustion. Any delay in unloading the tanker causes considerable expense and, of course, interferes with the production of the carbon black. It has been proposed to dilute the heavy oil with large quantities of a lighter material to cause it to become sufficiently fluid to flow properly through the pipeline. However, this is quite expensive, and it has been found that such dilution causes the carbon black to have poor abrasion resistance, low modulus and decreased photelometer reading. Also, the carbon black yield is reduced.

In accordance with this invention, the pipeline is maintained full of a light oil or material, such as a cycle oil, and this material is displaced from the pipeline as the heavy oil enters one end thereof. Advantageously, during periods of low ambient temperature, the light oil is displaced with a quantity of heated light oil before the pumping of the heavy oil begins. In this manner, the heavy oil is readily transported through the pipeline to the storage facilities at the end remote from the loading end, the pipeline being again filled with the light oil after pumping of the heavy oil has terminated. In this manner, setting up of the heavy oil in the pipeline is prevented, and the pipeline itself is protected from corrosion.

When operating in this manner, the heavy oil withdrawn from the pipeline contains a very small quantity, say 1 to 2 percent, of light oil, and this is fed to the carbon black reactors. Surprisingly, the inclusion of this small amount of light oil produces a substantial improvement in the pelleting characteristics of the carbon black without appreciable impairment of yield, abrasion resistance, and photelometer reading.

Further, in some cases, it is advantageous to strip water from the transported oil before it is passed to the carbon black furnaces. Where this is done, the overhead from the flash tower can advantageously be fed to a phase separator wherein an oil phase is recovered for additional processing.

Accordingly, it is an object of the invention to provide an improved method and apparatus for transporting heavy viscous materials.

It is a further object to provide a method of and apparatus for transporting heavy oils utilized in the manufacture of carbon black, the characteristics of the carbon black actually being improved as a result of the transportation procedure.

It is a still further object to provide an efficient economical and reliable way of rapidly unloading heavy oils from tankers and transporting them to storage facilities.

Various other objects, advantages and features of the invention will become apparent from the following detailed description taken in conjunction with the accompanying drawing, in which the figure is a schematic flow diagram of a transportation system constructed in accordance with the invention.

Referring now to the figure, we have shown a pipeline 10 extending along the surface of the earth from a tanker unloading facility 11 to a storage facility 12. In the transportation of the heavy viscous fluids of the invention, the line is at least two inches in diameter and has a length of 1,500 to 60,000 feet, although these factors may be varied in special applications. An oil storage tank 13 is connected to one end 14 of the pipeline by a pipe 15 having a valve 16, a pump 17, a steam heater 18 connected in series therein, there being a valved return line 19. A similar storage tank 20 is provided at the other end 21 of the pipeline, and it is connected to the pipeline by a valved pipe 22 including a pump 23, and a steam heater 24, with a valved return line 25.

A valved outlet line 26 extends from the end 21 of the pipeline and is connected by a valved line 27 to the top of the tank 20 and by valved lines 28, 29 and 30 to oil storage tanks 31 and 32, respectively.

Oil is withdrawn from the tanks 31 and 32 through lines 33 and 34 in which steam heaters 35 and 36 are connected, respectively. A line 37 connects both heaters to a pump 38 which, in turn, discharges into a surge tank 39. Branching from the pump outlet is a recirculation line 40 which can be connected by valved lines 41 and 42 to the respective storage tanks 31 and 32. From the surge tank 39, the oil flows through a line 44, a steam heater 45 and a pump 46 to one or more of a series 47 of valved inlet lines leading to carbon black furnaces, a return line 48 being provided from the lines 47 to the surge tank.

Line 44 is further connected by a valved line 49 and a heater 50 to an intermediate region of a flash tower 51 having a steam coil 52 at the bottom thereof. A line 53 connects the bottom of the tower 51 to the intake of the pump 46, and a line 54 connects the top of the tower 51 to a phase separator vessel 55 from which an aqueous phase can be withdrawn through line 56 and an oil phase refluxed to the tower 53 through a valved line 58 or returned to the intake of the pump 50 through a valved line 59.

In operation, the pipeline 10 is filled with a light oil, such as a light gas oil, heavy cycle oil or light cycle oil, the latter materials being advantageous in that they tend to dissolve heavy solidified materials accumulating at the interior walls of the pipeline. In some applications, kerosene or gasoline can be used as the light oil, and the material can be suitably condensed if its vapor pressure is too high. The light oil has an API gravity within the range of 20 to 45, preferably 20 to 26, and a flash point of at least 100° F., preferably 175 to 240° F.

Under conditions of low ambient temperature, i. e., below the pour point of the heavy oil, this light oil originally maintained in the pipeline is displaced with a heated light oil of the same composition before the pumping operation hereinafter described is started. When this is done, for example, the cold light oil can be displaced into tank 13 by heated light oil introduced into the end 21 of the pipeline from storage tank 20 at a temperature of 100 to 150° F.

With the pipeline filled with heated or cool light oil, depending upon the ambient temperature, heavy oil is introduced into the end 14 of the pipeline from the tanker unloading facilities 11. In making carbon black, a heavy highly aromatic petroleum residue having a Saybolt Furol viscosity at 122° F. of 170 to 190 is advantageously employed. However, the invention is applicable to many types of heavy viscous fluids which it is difficult to transport through pipelines such as waxy Venezuelan crude oil, an 85 to 100 penetration asphaltic cement having a Saybolt Furol viscosity at 210° F. of 1500, or a No. 6 fuel oil having a Saybolt Furol viscosity at 122° F. of 250 or higher. In general, the heavy oil has a Saybolt Furol viscosity within the range of 250 at 122° F. and 1500 at 210° F.

The heavy oil is introduced into the pipeline inlet at a pressure of 70 to 140 pounds per square inch gauge preferably at 100 to 120 pounds per square inch gauge and at a temperature of 120 to 250° F. Due to the previous introduction of the light oil, pumping rates of 2500 to 3000 barrels per hour can be readily obtained.

As the heavy oil is forced into the pipeline, it displaces the light oil which is withdrawn and passed to storage tank 20. When the last of the light oil has been displaced, the heavy oil is withdrawn from the pipeline and passed to one of the storage vessels 31 or 32, after which the pipeline is filled with light oil which remains therein until the next pumping cycle. During the pumping operation, the last portion of heavy oil is displaced from the pipeline by light oil fed into the end 14 from storage tank 13.

When applied to the manufacture of carbon black, the oil is withdrawn as required from tank 31 or 32, heated, and passed through the charge oil tank 39 to the carbon black furnaces. Due to its passage through the pipeline, the heavy oil contains from 0.2 to 5 percent of light oil, normally 0.5 to 1.3 percent. Surprisingly, this admixture improves the pelleting characteristics of the carbon black to a substantial degree as compared to the pelleting characteristics of black made from the heavy oil alone, and has substantially no adverse effect upon the yield, abrasion resistance, modulus and photelometer reading.

Where the oil contains appreciable quantities of water, it is introduced into the flash tower 51 wherein the oil is withdrawn through line 53 and passed to the carbon black furnaces through inlet lines 47, the overhead passing to phase separator 55 where an aqueous phase and an oil phase are formed, the water phase being removed through the line 56. Part of the oil phase is returned to the top of the flash tower, and the rest is introduced to the intake of the heater 50.

On a cold dry day with an ambient temperature of 30° F., a 10,000-ton tanker of heavy aromatic petroleum residue having viscosities at 90° F. and 130° F., respectively of 8000 SUS and 1313 SUS and a pour point of 55° F., arrived at the unloading facilities. These were connected by a 14,000-foot 14-inch pipeline to carbon black conversion oil storage tanks.

The pipeline had previously been filled with a light gas oil of 23 API gravity (oils in the range of 20-26 API gravity are suitable for this service) from storage tank 13. This cold oil was forced out of the pipeline and replaced by hot flush oil from the storage tank 20 beginning about two hours before the tanker docked. The flush oil was heated to 100-150° F. prior to pumping into the pipeline by a heater characterized by a steam heat exchanger on a recirculation system.

Since the capacity of the pipeline was approximately 2800 barrels, a pumping rate of 2500 to 3000 barrels per hour was sufficient to clear the pipeline of cold oil in approximately one hour and replace it with hot oil. Another hour was required to refill the heated pipeline with hot oil at 125-150° F., which maintained the pipeline above 100° F.

The steam facilities on the tanker were sufficient to supply 175° F. residual oil at pressures of 100-120 p. s. i. g. to the pipeline (other tankers have facilities capable of delivering 120-180° F. residual oil at 100-120 pounds per square inch gauge). This oil was pumped into the heated pipeline at a rate of 2500 barrels per hour and arrived at the storage facilities at 30-40 pounds per square inch gauge pressure and at a temperature of approximately 122° F. This rate was maintained for approximately 14 hours, whence a change in atmospheric conditions because of rain at 30° F. reduced the arrival head pressure to 20 pounds per square inch gauge and necessitated reduction in the pumping rate to 2200 barrels per hour for approximately 10 hours, after which the original rate was resumed.

In this manner the 10,000-ton tanker was unloaded in 26 hours under adverse conditions, which is only slightly slower than the 20 hours calculated as required to unload under ideal summer conditions. When the tanker was empty, flush oil was pumped into the line behind the residual oil from storage tank 13 to clear the line and leave a line full of flush oil to minimize corrosion and provide ease of start-up of the next unloading operation.

At the storage facilities the residual oil and flush oil were separated. The residual oil, now called carbon black conversion oil, contains approximately 1 percent of flush oil, which in subsequent operations, tended to improve the pelleting characteristics of the carbon black produced from the conversion oil. As the flush oil becomes mixed with residual oil, it is the practice to remove a portion of the mixture with the conversion oil and to replace the removed oil by an occasional receipt of a shipment of flush oil to storage tank 13.

It will be evident that we have achieved the objects of our invention in providing an improved transportation system for heavy viscous fluids, particularly aromatic oils used in the manufacture of carbon black. Rapid transportation through the pipeline is achieved, even under conditions of low ambient temperature, and the properties of the oil for the manufacture of carbon black are actually improved by the presence of small percentages of light oil. Moreover, water is advantageously removed from the oil, and the system ensures that the pipeline is ready to use at all times without the possibility of heavy oil or other material setting up therein.

While the invention has been described in connection with present, preferred embodiments thereof, it is to be understood that this description is illustrative only and is not intended to limit the invention.

We claim:

1. Process of transporting a heavy viscous fluid through a pipeline which comprises filling a pipeline with a light flowable fluid, introducing the heavy fluid to be transported into one end of the pipeline, thus displacing the light fluid, withdrawing the displaced light fluid from the other end of the pipeline, withdrawing the heavy fluid from said other end of the pipeline after all of the light fluid has been displaced, and refilling the pipeline with light fluid after the heavy fluid has been withdrawn therefrom, said last-mentioned light fluid displacing the last of the heavy fluid from the pipeline.

2. The method of transporting a heavy viscous material through a pipeline which comprises filling the pipeline with a light flowable fluid, displacing said light fluid with heated fluid of the same composition, introducing the heavy fluid into one end of the pipeline to displace the heated light fluid, withdrawing light fluid thus displaced from the other end of the pipeline and there storing it, withdrawing heavy fluid from said other end of the pipeline after all of the light fluid has been displaced, and introducing additional light fluid into said one end of the pipeline to displace the heavy fluid, the last-mentioned light fluid remaining in the pipeline until a subsequent pumping operation.

3. The method of transporting a heavy viscous petroleum oil having a Saybolt Furol viscosity within the range of 250 at 122° F. and 1500 at 210° F. which comprises filling a pipeline with a light oil having an API gravity within the range of 20 to 45 and a flash point of at least 100° F., introducing the heavy oil to be transported into one end of the pipeline thus displacing the light oil, withdrawing the displaced light oil from the other end of the pipeline and there storing the displaced material, withdrawing the heavy oil from said other end of the pipeline after all of the light oil has been displaced, and refilling the pipeline with light oil after the heavy oil has been withdrawn therefrom, said last-mentioned light fluid displacing the last of the heavy fluid from the pipeline.

4. The method of transporting a heavy viscous petroleum oil having a Saybolt Furol viscosity within the range of 250 at 122° F. and 1500 at 210° F. which comprises filling a pipeline with a light oil having an API gravity within the range of 20 to 45 and a flash point of at least 100° F., displacing said light oil with heated oil of the same composition, introducing the heavy oil into one end of the pipeline to displace the heated light oil, withdrawing light oil thus displaced from the other end of the pipeline and there storing it, withdrawing heavy oil from said other end of the pipeline after all of the light oil has been displaced, and introducing additional light oil into said one end of the pipeline to displace the heavy oil, the last-mentioned light oil remaining in the pipeline until a subsequent pumping operation.

5. The method of transporting a heavy viscous petroleum oil, said oil having a Saybolt Furol viscosity within the range of 250 at 122° F. and 1500 at 210° F. which comprises filling a pipeline with a light oil having an API gravity within the range of 20 to 45 and a flash point of at least 100° F., introducing the heavy oil to be transported into one end of the pipeline thus displacing the light oil, withdrawing the displaced light oil from the other end of the pipeline and there storing the displaced material, withdrawing the heavy oil from said other end of the pipeline after all of the light oil has been displaced, reintroducing the stored light oil into said other end of the pipeline after the heavy oil has been withdrawn therefrom, said last-mentioned light fluid displacing the last of the heavy fluid from the pipeline, said heavy oil being adapted to form carbon black having improved pelleting properties due to inclusion of a small amount of said light oil with the heavy oil charge.

6. The method of transporting a heavy viscous petroleum oil having a Saybolt Furol viscosity within the range of 250 at 122° F. and 1500 at 210° F. which comprises filling a pipeline with a light oil having an API gravity within the range of 20 to 45 and a flash point of at least 100° F., introducing the heavy oil to be transported into one end of the pipeline, thus displacing the light oil, withdrawing the displaced light oil from the other end of the pipeline and there storing the displaced material, withdrawing the heavy oil from said other end of the pipeline after all of the light oil has been displaced, introducing the withdrawn heavy oil into a flash zone, supplying heat to said flash zone to separate an overhead water product from the oil, said heavy oil being capable of forming carbon black having superior pelleting properties by virtue of containing 0.2 to 5 percent of said light oil due to admixture in the pipeline, condensing the overhead product from said flash zone, separating the condensed material into a water phase and an oil phase, and returning the oil phase to the flash zone.

7. The method of transporting a heavy viscous petroleum oil having a Saybolt Furol viscosity within the range of 250 at 122° F. and 1500 at 210° F. which comprises filling a pipeline with a light oil having an API gravity within the range of 20 to 45 and a flash point of at least 100° F., said pipeline having a length of 1,500 to 60,000 feet with a pipe diameter of at least two inches, displacing said light oil with oil of a similar composition heated to a temperature within the range of 100 to 150° F., introducing said heavy oil into one end of the pipeline at a rate of 2500 to 3000 barrels per hour at a temperature of 120 to 250° F. and a pressure of 70 to 140 pounds per square inch gauge, withdrawing the heated light oil from the other end of the pipeline as it is displaced by the heavy oil and there storing it, withdrawing heavy oil containing 0.5 to 1.3 percent of the light oil from said other end of the pipeline after the light oil has been displaced, and displacing the last quantities of said heavy oil with light oil introduced into said one end of the pipeline.

8. The method of transporting a heavy viscous petroleum oil having a Saybolt Furol viscosity within the range of 250 at 122° F. and 1,500 at 210° F. which comprises filling a pipeline with a light oil having an API gravity within the range of 20 to 45 and a flash point of at least 100° F., said pipeline having a length of 1,500 to 60,000 feet with a pipe diameter of at least two inches, displacing said light oil with oil of a smiliar composition heated to a temperature within the range of 100 to 150° F., introducing said heavy oil into one end of the pipeline at a rate of 2,500 to 3,000 barrels per hour at a temperature of 120 to 250° F., and a pressure of 70 to 140 pounds per square inch gauge, withdrawing the heated light oil from the other end of the pipeline as it is displaced by the heavy oil and there storing it, withdrawing heavy oil containing 0.5 to 1.3 percent of the light oil from said other end of the pipeline after the light oil has been displaced, displacing the last quantities of said heavy oil with light oil introduced into said one end of the pipeline, introducing the withdrawn heavy oil into a flash zone, supplying heat to said flash zone to separate an overhead water product from the oil, said withdrawn heavy oil being capable of forming carbon black having superior pelleting properties due to inclusion of 0.2 to 5 percent of said light oil due to admixture in the pipeline, condensing the overhead product from said flash zone, separating the condensed material into a water phase and an oil phase, and returning the oil phase to the flash zone.

9. Apparatus for transporting fluids which comprises, in combination, a pipeline having a diameter of at least two inches and a length of 1,500 to 60,000 feet, an oil storage tank at each end of the pipeline, two pipes connecting the tanks with the respective ends of the pipeline, a first heater and pump connected in series bypassing a portion of one of said pipes, a second heater and pump connected in series bypassing a portion of the other of said pipes, a separate oil storage tank located adjacent one end of the pipeline, and a pipe connecting said last-mentioned oil storage tank to said pipeline.

10. Apparatus for transporting fluids which comprises, in combination, a pipeline having a diameter of at least two inches and a length of 1,500 to 60,000 feet, an oil storage tank at each end of the pipeline, two pipes connecting the tanks with the respective ends of the pipeline, a first heater and pump connected in series bypassing a portion of one of said pipes, a second heater and pump connected in series bypassing a portion of the other of said pipes, a separate adjacent oil storage tank located adjacent one end of the pipeline, and a pipe connecting said adjacent oil storage tank to said pipeline, an oil surge tank, a line including a pump and heater connecting said adjacent oil storage tank to said surge tank, a flash tower, a line connecting said surge tank to an intermediate region of said tower, a phase separator connected to the top of said tower, a source of heat connected to the bottom of said tower, and an outlet line connected to the bottom of said tower.

References Cited in the file of this patent

UNITED STATES PATENTS

| | | |
|---|---|---|
| 2,031,018 | Thomas | Feb. 18, 1936 |
| 2,058,355 | Riney et al. | Oct. 20, 1936 |
| 2,453,708 | Hughes | Nov. 16, 1948 |
| 2,671,051 | Moore | Mar. 2, 1954 |